(12) United States Patent
Wrenwood Maloney et al.

(10) Patent No.: US 8,109,241 B2
(45) Date of Patent: Feb. 7, 2012

(54) DOG BOOT

(76) Inventors: Mary Kathleen Wrenwood Maloney, Pacific Palisades, CA (US); Michael Thomas, Toluca Lake, CA (US); Jay Garcia, Santa Ana, CA (US)

( * ) Notice: Subject to any disclaimer, the term of this patent is extended or adjusted under 35 U.S.C. 154(b) by 295 days.

(21) Appl. No.: 11/215,189

(22) Filed: Aug. 29, 2005

(65) Prior Publication Data
US 2007/0044734 A1    Mar. 1, 2007

(51) Int. Cl.
*A01K 13/00* (2006.01)
*A01K 29/00* (2006.01)

(52) U.S. Cl. .......................... 119/850; 119/856

(58) Field of Classification Search .......... 119/850–851, 119/856–860, 862–865; 54/82
See application file for complete search history.

(56) References Cited

U.S. PATENT DOCUMENTS

| | | | | |
|---|---|---|---|---|
| 2,424,172 A | * | 7/1947 | Huddleston | 36/111 |
| 2,446,371 A | * | 8/1948 | McNeill Jones | 36/111 |
| 4,458,431 A | * | 7/1984 | Sinclair | 36/88 |
| 5,148,657 A | * | 9/1992 | Stafford et al. | 54/82 |
| 5,408,812 A | * | 4/1995 | Stark | 54/82 |
| D382,378 S | * | 8/1997 | Stark | D30/146 |
| 6,470,832 B1 | * | 10/2002 | Peacock | 119/850 |
| 6,526,920 B1 | * | 3/2003 | Griffin | 119/850 |
| D514,262 S | * | 1/2006 | Sabeh-Azar | D30/146 |
| 2005/0092260 A1 | * | 5/2005 | Paxton et al. | 119/850 |
| 2005/0241188 A1 | * | 11/2005 | Yun et al. | 36/111 |
| 2006/0037561 A1 | * | 2/2006 | Fine | 119/850 |
| 2007/0039565 A1 | * | 2/2007 | Krottinger | 119/850 |

FOREIGN PATENT DOCUMENTS

| | | | |
|---|---|---|---|
| CA | 2190398 | * | 5/1998 |
| GB | 2406493 | * | 4/2005 |
| JP | 10-66472 | * | 3/1998 |
| JP | 2003-88266 | * | 3/2003 |
| JP | 2003-225031 | * | 8/2003 |
| JP | 2004-208615 | * | 7/2004 |

* cited by examiner

*Primary Examiner* — David Parsley
(74) *Attorney, Agent, or Firm* — Jim Passe; Passe Intellectual Property, LLC

(57) ABSTRACT

A dog boot is provided comprising a generally vertical and cylindrical elongated tubular legging portion ending in and connected to a toe-box portion both of which are attached within a generally horizontal non-slide sole portion. The legging portion extends upwardly from the toe-box portion and defines an offset longitudinal slit providing adjacent, opposite, overlapping flap portions that are equipped with loop and hook fastening material allowing for ease of insertion and extraction of the dog's leg and paw. The generally tubular legging portion has two adjustable fastening straps for cinching the legging portion securely at two separate points around the dog's leg. Within the non-slide portion is a removable sole insert shaped to receive the pads of the dog's paw wherein the removable sole insert works as a shock absorber for the dog and adds comfort and stability during wear.

8 Claims, 5 Drawing Sheets

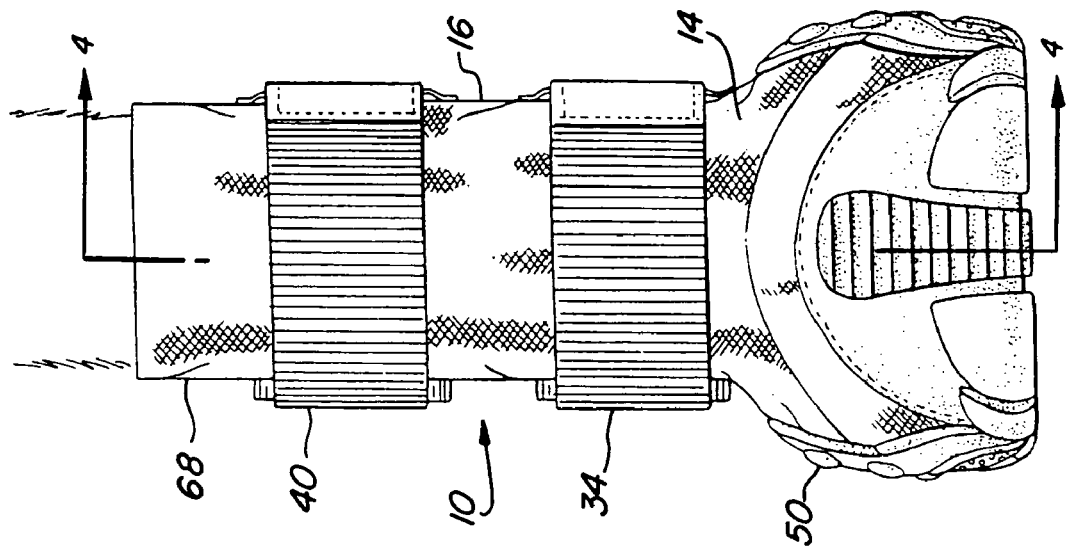
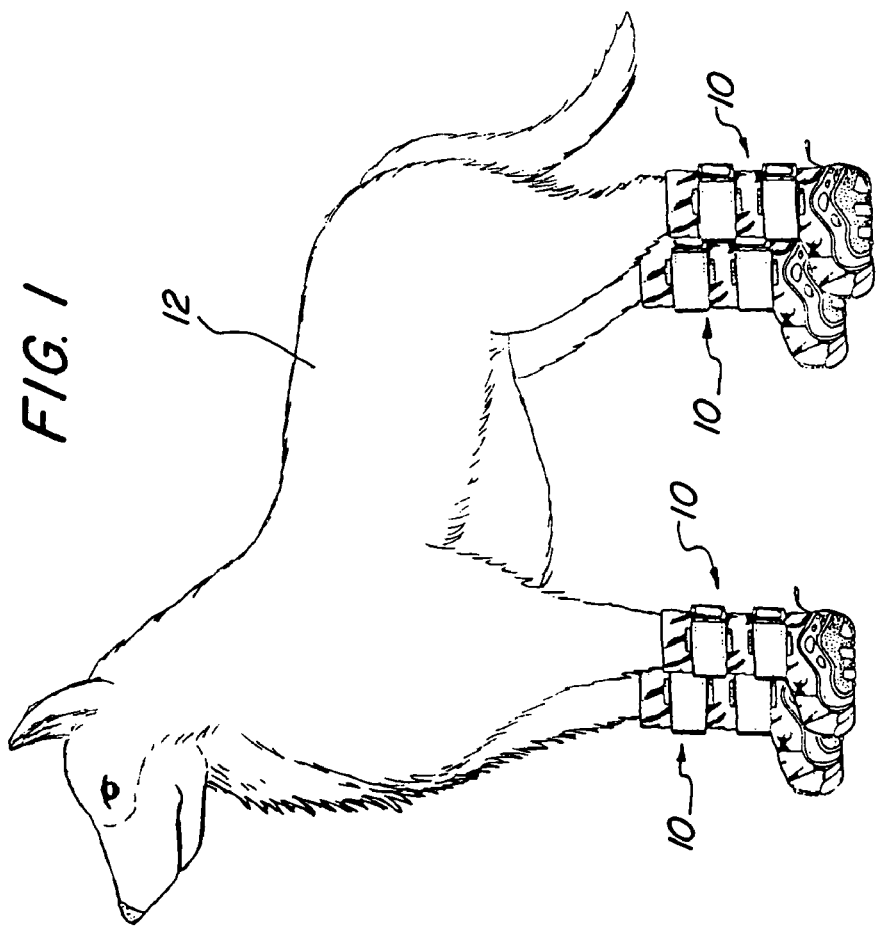

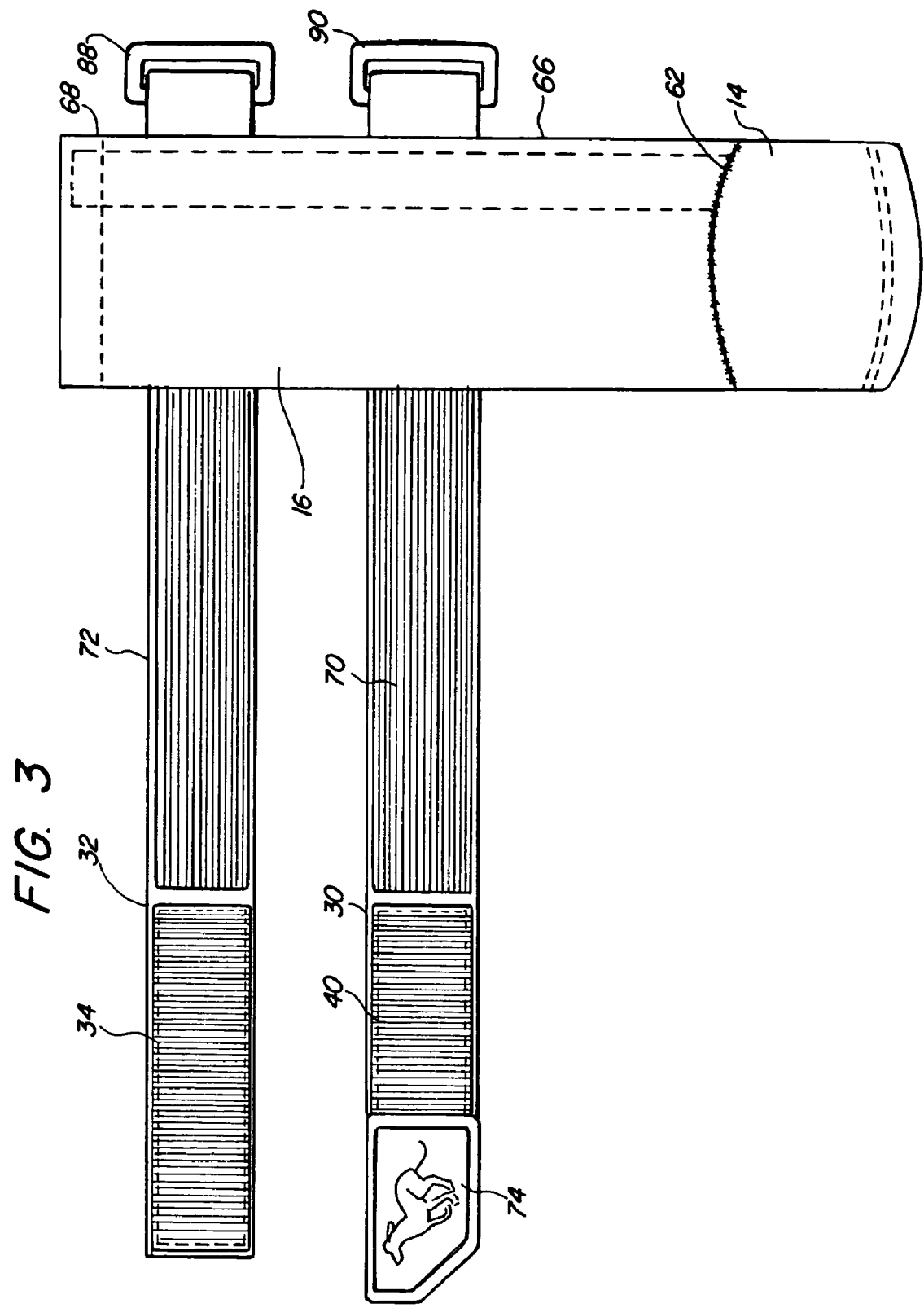

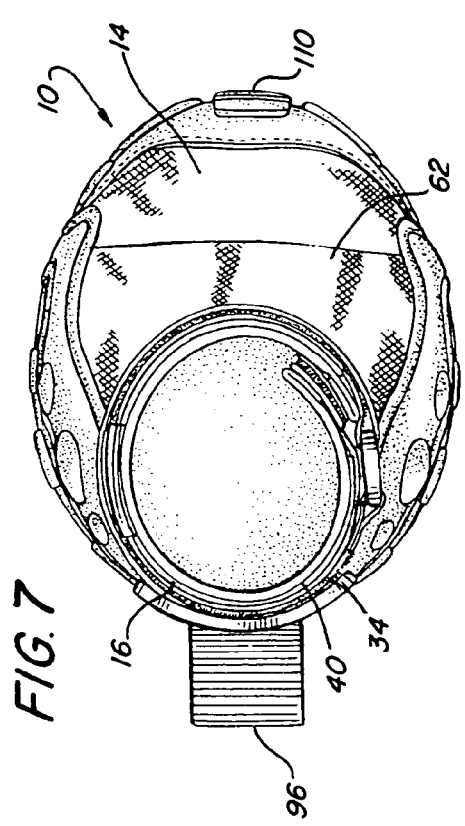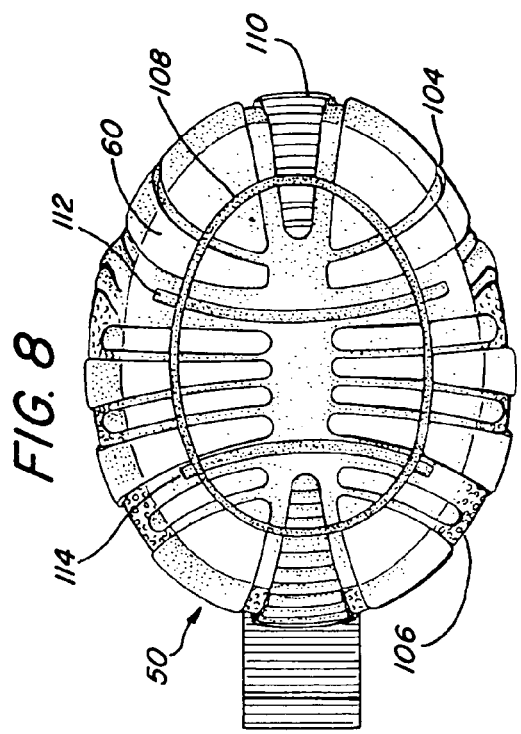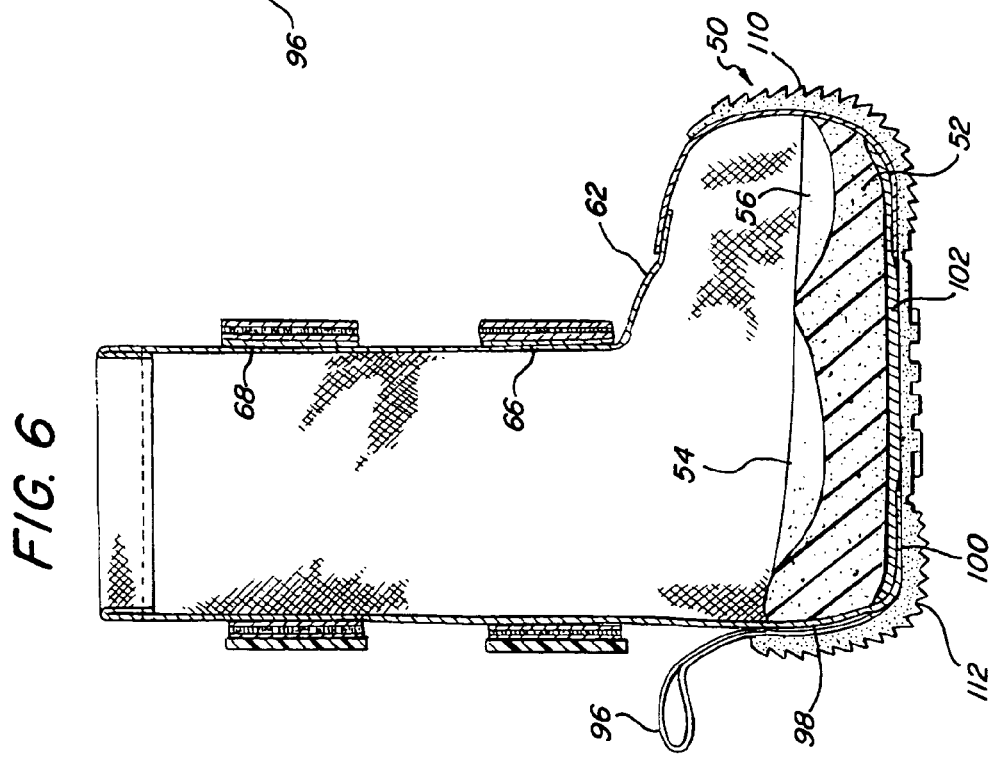

ID DOG BOOT

FIELD OF THE INVENTION

The present invention relates to protective wear for the feet of canines, and more particularly to a protective boot for the paws and legs of a dog.

BACKGROUND

When a dog is used in the field for activities such as rescue missions or hunting, the feet and legs of the animal are susceptible to a number of hazards. Harsh terrain, and thorns and burrs can lead to painful, sore paws, and running through underbrush can often subject the animal's legs to scraping, cuts, and abrasion. Additional hazards confront the dog when he hunts in cold weather, and in wet conditions where exposure of the dog's feet and legs can lead to discomfort stiffening of the joints, and excessive chilling. Dogs that are kept primarily as domestic pets for most of the year are particularly susceptible to such injury and harm in the field. Therefore, a need exists for providing a dog boot that solves all of these problems in a unique and novel manner. The dog boot of the present invention meets this need.

SUMMARY

A dog boot is provided comprising a generally vertical and cylindrical elongated tubular legging portion ending in and connected to a toe-box portion both of which are attached within a generally horizontal non-slide sole portion. The legging portion extends upwardly from the toe-box portion and defines an offset longitudinal slit providing adjacent, opposite, overlapping flap portions that are equipped with loop and hook fastening material allowing for ease of insertion and extraction of the dog's leg and paw. The generally tubular legging portion has two adjustable fastening straps for cinching the legging portion securely at two separate points around the dog's leg. Within the non-slide portion is a removable sole insert shaped to receive the pads of the dog's paw wherein the removable sole insert works as a shock absorber for the dog and adds comfort and stability during wear.

Other objects, features and advantages of the present invention will become readily apparent in view of the following detailed description in conjunction with the drawings.

BRIEF DESCRIPTION OF THE DRAWINGS

FIG. 1 is a perspective view of the dog boot mounted on the front and rear dog paws and lower legs of a dog;

FIG. 2 is an enlarged front perspective view of the dog boot with a Velcro flap and straps in a closed position;

FIG. 3 is a front plan view of the legging and toe box portions of the dog boot;

FIG. 6 is a cut away side view of the dog boot shown in FIG. 2;

FIG. 7 is a top view of the dog boot; and

FIG. 8 is a bottom view showing the dog boot's sole.

DETAILED DESCRIPTION OF THE DRAWINGS

Figure 4:
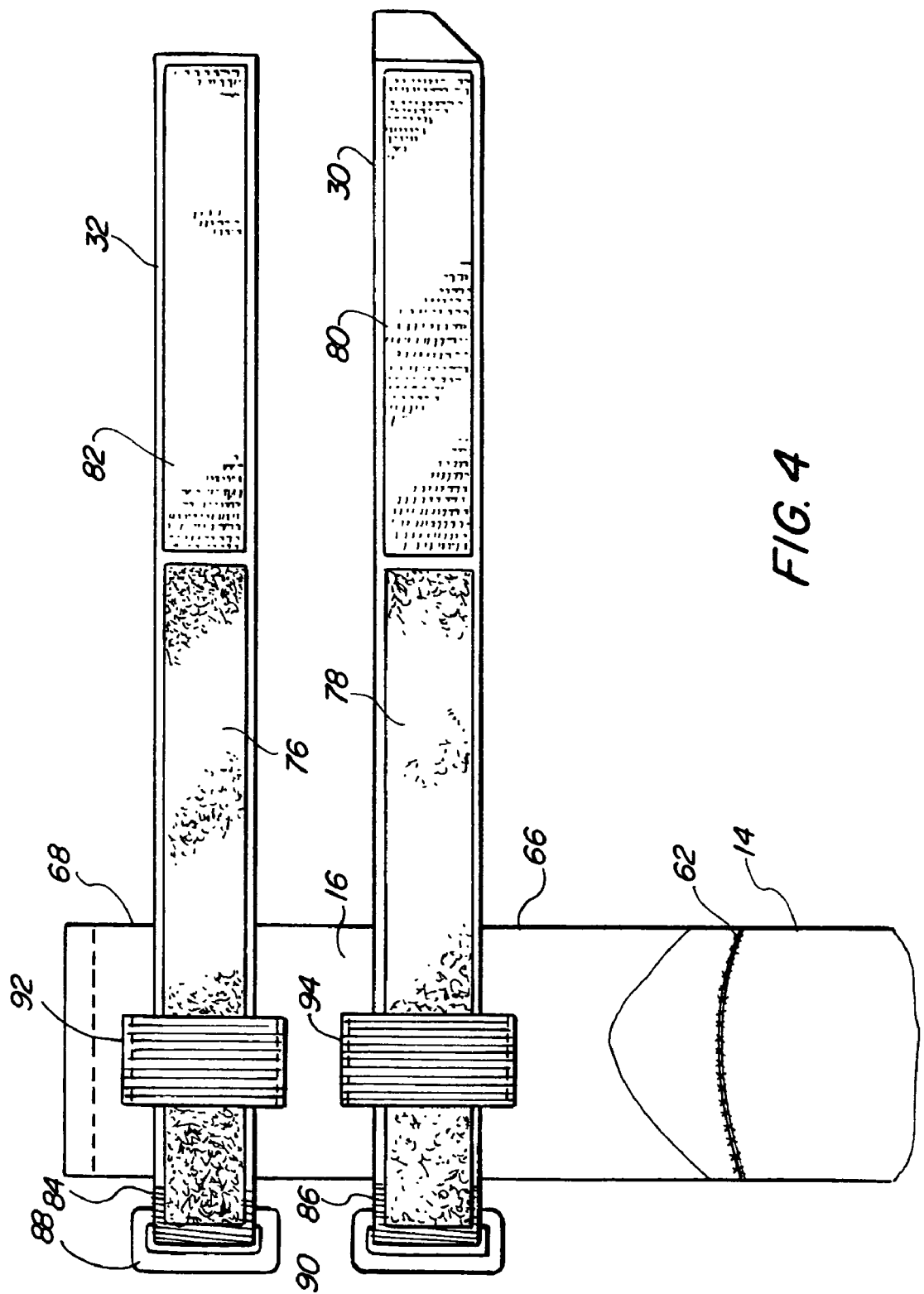
FIG. 4 is a back plan view of the legging and toe box portions of the dog boot.

Referring to FIGS. 1 and 2 there are shown perspective views of the improved dog boot having a general reference numeral 10. In FIG. 1 the dog boot 10 is shown mounted on the front and rear dog paws and lower legs of a dog 12. By the nature of the anatomy of a dog's lower legs the front dog boots 10 have a sock length or legging portion 16 which is made longer in length than the rear dog boots 10 legging portion. Therefore, the dog boot 10 is made in different sizes for different size dogs.

Turning to FIG. 2 the dog boot 10 comprises a generally vertical and cylindrical tubular elongated legging portion 16 connected to a toe-box portion 14 both of which are attached to the inside of a generally horizontal non-slide sole portion 50. The generally vertical and cylindrical tubular legging portion 16 is made from a soft four way stretch fabric (manufactured by Schoeller, Inc.), shaped to have an extending sock form which starting at the top 68 extends from the dogs lower leg to down around over the dog's ankle and heal and foot bridge ending in and connecting to a portion of GORE-TEX or a similar type of material which is shaped to form the toe box portion 14 about the stretch fabric legging portion 16. The four way stretch fabric is a snag proof, water repellent, durable, flexible, breathable, thermally insulated material and is used primarily for its lightweight, all season comfort for sportswear. By way of example only it may have a deep royal blue color appearance.

The legging portion 16 is shaped to receive what is informally described as the dog's foot and ankle. The toe box portion 14 is made from the GORE-TEX type of material for its water repellent and breathable properties wherein GORE-TEX has enough durable body to hold a toe box form. The GORE-TEX material allows for free toe movement, no binding or allowing too much toe movement. The legging and toe box portions 16 and 14 material choices provide wearable comfort and are able to withstand harsh weather and rough terrain. Additionally the legging and toe box portions 16 and 14 are non-obtrusive when worn during motion and at rest wherein their stretch feature lends to different size adjustments and durability having a longer lasting good clean look for longer wear. As shown in FIG. 2 the legging and toe box portions 16 and 14 are attached to each other using conventional commercial stitching and sealing techniques shaped to receive the dog's paw region and are further attached within the non-slide sole portion 50 as will be more fully described below.

Referring now to FIGS. 3 and 4, the generally tubular legging portion 16 has two adjustable fastening straps 30 and 32 for cinching securely at two separate points around the dog's leg as shown in FIG. 2. The first adjustable fastening strap member 30 is attached to the lower part 66 of legging portion 16 with the second strap member 32 attached near the upper end 68 of legging portion 16. The strap members 30 and 32 are fabricated using flat woven webbing having the same lengths on the front and back legs but differing in length according to the size of the boot/sneaker depending on the size of the dog. By way of example only the webbing may be one inch wide. Referring to FIG. 3 the inner sides of fastening straps 30 and 32 each has neoprene strips 70 and 72 attached with each serving as padding between the webbing and leg. By way of example only each neoprene strip 70 and 72 respectively may be one half the strap lengths 30 and 32. On the second half of the inner sides of strap lengths 30 and 32 are attached reflective ribbons 40 and 34 for safety concerns. A PVC badge 74 with an upraised logo is sewn to the end of either or both straps and on top of the reflective ribbon for marketing purposes and is shown by way of example on strap 30 in FIG. 3.

Referring to FIG. 4 the outer sides of the two adjustable fastening straps 30 and 32 has fuzzy VELCRO 78 and 76 which are one half the strap length and located and affixed on the opposing side of the neoprene strips 70 and 72 shown in FIG. 3. On the second half of the outer sides of strap lengths 30 and 32 are rough or loop VELCRO 80 and 82 that are located and affixed on the opposing side of the reflective ribbons 40 and 34 respectively. Grow grain ribbons 86 and 84 each secures plastic loops 38 and 42 wherein each is anchored by sewing them between the fuzzy VELCRO strips 78 and 76 and the webbing positioned at the sock opening. By way of example only the grow grain ribbons 86 and 84 respectively each may be one inch in width for securing the plastic loops 38 and 42 which may also be one inch wide. A matching thread may be used for each attachment, i.e. a gray reflective ribbon is sewn to a black webbing by use of a two bobbin sewing system wherein the top bobbin holds a matching gray thread while the bottom bobbin holds black.

Figure 5:
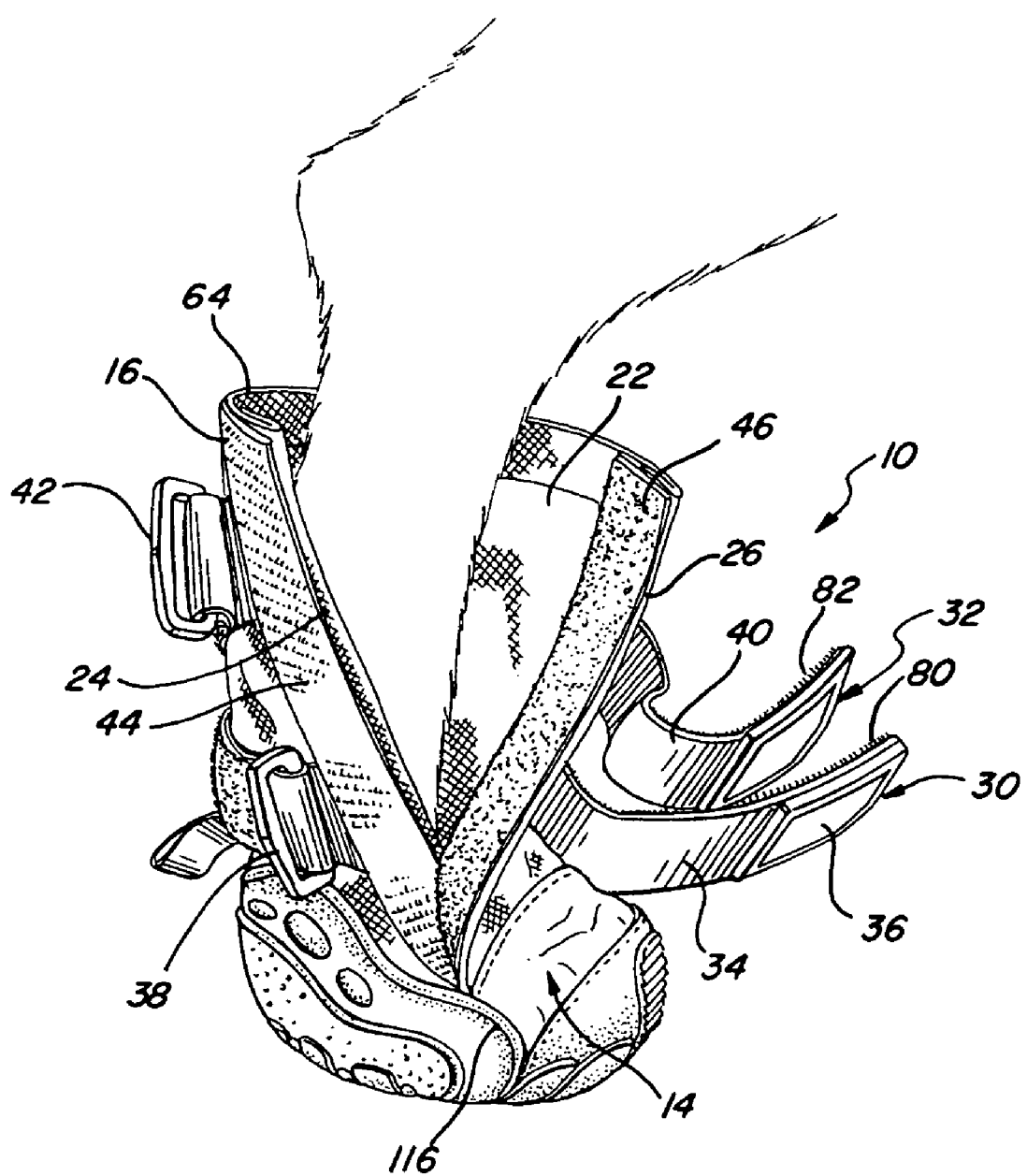
FIG. 5 is a perspective view of the dog boot with the Velcro flap and straps in an open position with the dog's paw and lower leg inserted into the dog boot.

Referring to FIGS. 5 and 6, the lower end 68 of legging portion 16 is firmly secured to the upper part 62 of toe box portion 14 using stitching or other suitable means as shown in FIGS. 3 and 4. Referring to FIG. 5 the legging portion 16 having a generally tubular configuration defines an offset longitudinal slit or opening 22 extending to the top 62 of toe box portion 14 providing for a marginal VELCRO front edge flap 24 and an equally matched opposing marginal VELCRO edge flap 26, wherein the VELCRO flaps may be positioned in an overlapping relationship when legging portion 16 is mounted over a dog's leg. As shown in FIG. 5 the VELCRO openings 24 and 26 respectively are attached running longitudinally in front and off center toward the outside of the dog's leg stopping at the GORE-TEX material, keeping the toe box 14 area isolated from the opening 22. By way of example only fuzzy VELCRO may be sewn and located to run down the front flaps edge 24 and may be 1/16 to 2/16 of an inch in from the legging portion's 16 opposing edge to ensure a smooth edge to protrude and keep the VELCRO hidden. By way of example only rough VELCRO may be sewn down the opposite side opening or edge flap 26 and be 1/16 to 2/16 of an inch in from the opening edge and singularly anchoring the two webbed straps 32 and 30 into their assigned positions. It should be noted that by sewing the front edge flap 26 of VELCRO 1/16 to 2/16 of an inch in from the edge, it avoids having the sharp edge portion of the VELCRO ribbon to run on the leg of the dog.

Referring to FIG. 4 there is shown the use of sturdy, medium weight elastic portions. 94 and 92 sewn on the back of the legging portion 16 and aligning with the webbed straps 32 and 30 to serve as "belt loops". By way of example the belt loop portions 94 and 92 may be a ¾" wide piece cut approximately 2½" long having a ¾" square piece of fuzzy VELCRO attached which is centered and sewn to the elastic loops. Referring to FIGS. 2 through 5 the dimensions of the legging portion 16 are chosen such that when the boot 10 is applied to a dog's leg, the legging portion 16 may be wrapped snugly around the leg with the flap 26 overlapping the flap 24 and secured in this position by virtue of engaging the VELCRO strips of flaps 24 and 26 respectively.

To further secure the boot to the leg, strap 34 is engaged through loop 38 and drawn there through in order to gather the legging material in firmly against the dog's leg. Strap 34 is then secured. Similarly the strap 40 is drawn through loop 42 so as to gather the upper part of legging 16 in against the dog's leg. Thus when boot 10 is mounted as illustrated in FIGS. 1 and 2 the paws, and a substantial portion of the dog's leg, are well protected against hazards of the outdoor environment wherein the toe box portion 14 and sole portion 50 protect the feet and legging portion 16 keeps the joints, muscles and tendons warm in cold weather. Additionally, as shown in FIGS. 6 and 7 a 7" by ¾" piece may be looped and sewn to the inner floor of the sole at the heel which may be used as an alternative lower belt loop for those who need tighter securing or stabilization of the sole to sock.

Turning now to FIG. 6, there is illustrated a cut away side view of the dog boot shown in FIG. 2. As shown in FIG. 6, within the non-slide sole 50 is a removable inner sole insert 52 that may be made from a soft gel material fitting independently within the foot bed of the sole 50 and defines concave portions 54 and 56 designed and shaped for receiving the pads of a dogs paw. The removable sole insert 52 works as a shock absorber for the dog and adds comfort and stability during wear. Although the inner sole 52 rubber gel-like wafer is thick enough to serve as a shock absorber it is also one of two protective layers between the dog's paw and the inner floor of outer sole bed. This protective layer acts as a buffer from extreme temperature conditions on terrain surfaces. The concave portions 54 and 56 embody actual toe imprints in the gel surface to secure the dog's paw for comfort and dexterity, still allowing natural movement within the shoe bed. The inner sole 52 is removable for easy rinsing and drying if necessary; yet thin enough to keep the shoe area naturally roomy and comfortable on all sides. The placement is such that the foot falls well below the top edge of the outer sole walls to keep the foot close to the ground for stability and dexterity.

Referring to FIG. 6 an anchoring sole piece material 102 is provided which is made of a rubber or water repellent material for placement between the rubber outer sole 50 and gel like inner sole shape 52. The anchoring piece 102 is shaped like the inner floor of the outer sole and is used to anchor both the outer sole to the legging and toe box portions 16 and 14 and to stabilize positioning of the legging and toe box portions 16 and 14 within the outer sole. By placing the "anchoring sole" piece at the base of the legging and toe box portions 16 and 14 (a point at which the sock formation has stopped and an oval opening positioned at what would be the sole of the dog foot area), and covering the outside circumference of anchoring piece with sock material gluing to create a smooth surface, and then inserting the anchoring sole with the now attached sock into the foot bed of the outer sole, stitching can now be put in place using the stitch canal on bottom of the outer sole. This stabilizing procedure will align with the sock material that has been placed ¼-½" in from the edge of the bottom of the "anchoring piece" thereby enabling stitching to secure the sock to anchoring the sole in addition to the glue that first help put material in place on the anchoring sole.

FIGS. 7 and 8 show top and bottom views of the dog boot 10. In FIG. 7 the straps 30 and 32 of the legging portion 16 are shown received or wrapped around the dog's leg to prevent the leg from twisting on the lower leg of the dog and slipping off the dog paw. Also, the bottom of the non-slide sole 50 has a grooved bottom design portion 60 for better traction when the dog is running or walking. The outer sole 50 is sloped to accomplish a stable yet flexible platform for the dog's foot and stays close to the ground for stability. Referring to FIG. 8, the bottom of the sole 50 is beveled out slightly on the bottom edges for stability and incorporates a thread pattern for traction on the exterior bottom of the sole with a curved forward 112 and rear canal 114 for flexibility. Another carved canal 108 is set in from the exterior edge and runs the circumference of the bottom of sole to accommodate stitching.

Additionally, exterior sides are rounded out and upward and in to caress the foot. Another carved canal 116 is set down from the top edge, (also used as design element) of the outer wall on the sole and runs the circumference of the outer wall on the sole to accommodate additional stitching as shown in FIG. 5. A front rubber toe lip 110 is provided and designed to protect the toe area from rough terrain, curving down on both sides of the toe box area to accommodate toe spread for added traction and dexterity. This configuration also stabilizes the toe box and adds to the overall design. The heel of the outer sole dips down below the sidewalls to enable proper alignment of the leg while the dog is in a down position, as shown in FIG. 1. Finishing off the construction process is the placement of a thin layer of glue located on the interior walls of the outer sole, molding sock material to adhere to those interior walls before employing a circumference of stitching in the appointed stitch canal set down slightly from the top walls of the outer sole.

It is appreciated that various other alternatives, modifications, variations, improvements, equivalents or substantial equivalents of the teachings herein that for example, are or may be presently unforeseen, unappreciated or subsequently arrived at by applicants or others are also intended to be encompassed by the claims and amendments thereto.

What is claimed is:

1. A dog boot having a heal, front and sides for use on a dog's lower leg and paw, the boot comprising:
    a) a tubular elongated legging portion covering the dog's lower leg;
    b) a toe box portion positioned from where the legging portion ends to the dog's toes and secured to the legging portion;
    c) a non-slide outer sole having a front toe lip, an inner floor, a heal and sides wherein the toe lip and the sides of the sole curve upward around at least a portion of the outside of the toe and sides of the boot;
    d) an anchoring sole;
    e) an inner sole which is removable from the boot; and
    wherein each of the anchoring sole, the inner sole and the outer sole are separate soles, wherein the anchoring sole is disposed between the inner and outer soles with a front portion of the anchoring sole disposed between the inner sole and the toe box, and wherein the inner sole comprises two concave depressions shaped and positioned for receiving the pads of a dogs paw.

2. A dog boot having a heal, front and sides for use on a dog's lower leg and paw, the boot comprising:
    a) a tubular elongated legging portion having an open upper end made from a soft stretch fabric for covering the dog's lower leg down to the dog's footbridge comprising:
        i. a longitudinal slit opening in the legging portion extending downward from the open upper end which is openable and closable by way of hook and loop fasteners;
        ii. one or more adjustable fastening strap and loop for cinching the legging portion around the dog's lower leg;
    b) a toe box portion made from a fabric having enough durable body to hold a toe box form for covering the dog's paw from where the legging portion ends at the dog's footbridge to the dog's toes and secured to the legging portion wherein the longitudinal slit opening is positioned such that the toe box is isolated from the slit opening;
    c) a non-slide outer sole having a front toe lip, an inner floor, a heal and sides wherein the toe lip and the sides of the sole curve upward around at least a portion of the outside of the toe and sides of the boot;
    d) an anchoring sole;
    e) an inner sole which is removable from the boot; and
    wherein each of the anchoring sole, the inner sole and the outer sole are separate soles, wherein the anchoring sole is disposed between the inner and outer soles with a front portion of the anchoring sole disposed between the inner sole and the toe box, and wherein the inner sole comprises two concave depressions shaped and positioned for receiving the pads of a dogs paw.

3. The dog boot according to claim 2 wherein each of the fastening straps have neoprene strips located and affixed on at least a portion of an inner side of the fastening straps.

4. The dog boot according to claim 3 wherein the hook and loop fasteners are attached to the fastening strap on the side opposing the neoprene strips.

5. The dog boot according to claim 2 wherein the end of the fastening strap comprises has a pull tab.

6. The dog boot according to claim 2 wherein the fastening strap further comprises a reflective ribbon.

7. The dog boot according to claim 2 wherein the fastening straps further comprise grows grain ribbons.

8. The dog boot according to claim 2 wherein the longitudinal slit is positioned in the front of the boot, off center toward an outside of the dog's leg.

* * * * *